United States Patent
Xu et al.

(10) Patent No.: US 11,646,649 B2
(45) Date of Patent: May 9, 2023

(54) POSITION SENSORLESS CONTROL METHOD IN LOW-SPEED REGION OF FAULT-TOLERANT PERMANENT MAGNET MOTOR SYSTEM BASED ON ENVELOPE DETECTION AND NON-ORTHOGONAL PHASE-LOCKED LOOP

(71) Applicant: Beihang University, Beijing (CN)

(72) Inventors: Jinquan Xu, Beijing (CN); Hong Guo, Beijing (CN); Hao Fang, Beijing (CN)

(73) Assignee: Beihang University, Beijing (CN)

( * ) Notice: Subject to any disclaimer, the term of this patent is extended or adjusted under 35 U.S.C. 154(b) by 327 days.

(21) Appl. No.: 17/187,791

(22) Filed: Feb. 27, 2021

(65) Prior Publication Data
US 2021/0281154 A1    Sep. 9, 2021

(30) Foreign Application Priority Data

Feb. 28, 2020    (CN) .......................... 202010129634.2

(51) Int. Cl.
*H02K 21/12*    (2006.01)
*H02P 23/00*    (2016.01)
*H02P 6/08*    (2016.01)

(52) U.S. Cl.
CPC ............. *H02K 21/12* (2013.01); *H02P 6/085* (2013.01); *H02P 23/009* (2013.01); *H02P 2207/055* (2013.01)

(58) Field of Classification Search
None
See application file for complete search history.

(56) References Cited

FOREIGN PATENT DOCUMENTS

| CN | 103701367 A | * | 4/2014 | |
| CN | 109450317 A | * | 3/2019 | .......... H02P 21/0021 |
| WO | WO-2012131344 A2 | * | 10/2012 | ................ H02P 1/04 |

* cited by examiner

*Primary Examiner* — Muhammad S Islam
*Assistant Examiner* — Bradley R Brown

(57) ABSTRACT

In the position sensorless control method in low-speed region of the fault-tolerant permanent magnet motor system based on the envelope detection and the non-orthogonal phase-locked loop of the present disclosure, the position sensorless control of the motor is implemented by injecting the high-frequency voltage signals into any two non-faulty phase windings of the motor, extracting the high-frequency response currents of the high-frequency injected phases by the digital bandpass filter, calculating the differential mode inductances of the two phase windings through the envelope detecting and signal processing, and extracting the rotor position and rotational speed signals from the estimated two phase inductances through the non-orthogonal phase-locked loop. In addition, the controller of the present disclosure is small in size, high in accuracy, and high in reliability, which can effectively meet the performance requirements of the onboard electric actuators.

20 Claims, 4 Drawing Sheets

POSITION SENSORLESS CONTROL METHOD IN LOW-SPEED REGION OF FAULT-TOLERANT PERMANENT MAGNET MOTOR SYSTEM BASED ON ENVELOPE DETECTION AND NON-ORTHOGONAL PHASE-LOCKED LOOP

CROSS-REFERENCE TO RELATED APPLICATION

This application claims priority from the Chinese patent application 2020101296342, filed Feb. 28, 2020, the content of which is incorporated herein in the entirety by reference.

TECHNICAL FIELD

The present disclosure relates to the field of drive control technology of a fault-tolerant permanent magnet motor, and in particular relates to a position sensorless control method in low-speed region of a fault-tolerant permanent magnet motor system for a high-reliability onboard electric actuator based on envelope detection and a non-orthogonal phase-locked loop.

BACKGROUND

With increasing electrification of onboard equipment, the more-electric/all-electric aircraft gradually become a main development subject of future aircraft due to significant technical advantages. The typical features of more-electric/all-electric aircraft are as follows: electric actuators have replaced hydraulic and pneumatic transmission mechanisms in traditional aircraft; centralized hydraulic oil sources and pipelines across the entire aircraft body are reduced or completely eliminated, realizing reduced aircraft weight, simplifying the secondary energy system structure of the aircraft, and greatly reducing the operating cost of the aircraft. The more-electric/all-electric aircraft has overcome the shortcomings of a traditional onboard hydraulic system such as poor maintainability, low reliability, high noise, oil leakage and serious pollution, and improves the efficiency, maintainability, reliability and ground support capabilities of the aircraft. Electric actuators are widely applied in flight control systems, electric environmental control systems, electric fuel pump systems, engine control systems, electric brake systems and landing gear.

The motor drive system is the core of an electric actuator, which has a decisive influence on performance of the entire actuation system. To satisfy the reliability requirement, the fault-tolerant permanent magnet motor system is a primary choice for onboard electric actuator motor systems due to advantages such as high power density, strong fault tolerance, good fault isolation, and high efficiency.

Position/speed detection is one of the key components for the closed-loop control of fault-tolerant permanent magnet motor, which is associated with the control performance of the control system. The position/speed detection of the motor is usually performed by a position sensor. However, the use of the position sensor increases the hardware complexity, volume and weight of the system, which also decreases the reliability of the system. Therefore, a position sensorless control method is representative of an important research direction of high-reliability motor drive systems.

The inventor once proposed a drive controller of a fault-tolerant permanent magnet motor system for an onboard electric actuator and a control method for the fault-tolerant permanent magnet motor system in 2019 (Chinese invention patent application No. ZL201910234708.9), wherein a motor controller acquires current signals of respective phase windings of the motor with Hall current sensors, and then motor speed and rotor position signals are estimated by a high-precision sensorless control method by using back-electromotive force (EMF) signals of two non-faulty phase windings, thereby improving the accuracy and reliability of motor speed/position detection. In such control method, the back-EMFs of two phase windings are estimated by using a robust observer model, and in turn, the control of the fault-tolerant permanent magnet motor is achieved by extracting rotor position and rotational speed signals from the estimated back-EMF, therefore the control method is appliable for fault-tolerant permanent magnet motors operating at high speeds. However, although being also a sensorless control method, the control method can only be applicable to fault-tolerant permanent magnet motors operating at high speeds, which can not be applicable to the fault-tolerant permanent magnet motors operating at low speeds since the back-EMF method no longer works for the latter.

For the sensorless control of a permanent magnet synchronous motor (PMSM) in low-speed region, a high-frequency injection method is a main strategy. The conventional high-frequency injection method is based on coordinate transformation and is dependent on the symmetry phase windings of a motor. However, it is difficult to perform the coordinate transformation when the fault-tolerant permanent magnet motor is running in the fault condition, since the remaining non-faulty phase windings are in an asymmetrical operation state. As a consequence, the conventional high-frequency injection method cannot realize the position sensorless control of the fault-tolerant permanent magnet motor in fault operation. In order to meet the reliability requirements of onboard electric actuators, it is necessary to simplify the system structure and conduct research on sensorless control methods of fault-tolerant permanent magnet motors in low-speed region. The present disclosure proposes a new position sensorless control method based on the envelope detection and the non-orthogonal phase-locked loop, in which the high-frequency voltage signals are injected into any two non-faulty phase windings of the motor. The inductances of the two phase windings can be estimated by the envelope detection, while the non-orthogonal phase-locked loop can be used for extracting the rotor position and rotational speed information from the estimated two phase inductances. In the position sensorless control method according to the present disclosure, the high-frequency voltage signals are directly injected into any two non-faulty phase windings, and the method does not require any coordinate transformation and does not rely on the symmetrical operation of the phase windings, and thus is applicable to position sensorless control of the fault-tolerant permanent magnet motors in both normal and faulty operation conditions.

SUMMARY

The present disclosure provides a highly-reliable sensorless control method of fault-tolerant permanent magnet motor system in low-speed region based on envelope detection and non-orthogonal phase-locked loop, which is appliable to the position sensorless control of the fault tolerant motor in fault operation condition. The essence of the present disclosure is to realize position sensorless control of the fault-tolerant permanent magnet motor in normal and faulty operations by injecting the high-frequency voltage signals into any two non-faulty phase windings of the motor. The envelope detection is then proposed to estimate two phase inductance, while the non-orthogonal phase-locked loop is proposed to extract the rotor position and rotational speed signals in the estimated inductances.

In the position sensorless control method of the fault-tolerant permanent magnet motor system of the present disclosure, the fault-tolerant permanent magnet motor system includes a fault-tolerant permanent magnet motor, a signal detection circuit, an isolation drive circuit, a fault-tolerant power drive circuit, a Digital Signal Processor (DSP) system and a Field Programmable Gate Array (FPGA) system. The DSP system includes a speed loop controller, a fault-tolerant controller and a sensorless resolving module, and is configured for the speed loop control, the calculation of the fault-tolerant current given instruction, the conditioning of the estimated inductance signal, and the resolving of the rotor position and speed based on the differential mode inductance of two phase windings of the system. The FPGA system includes a current A/D sampling control module, a current loop controller, a Pulse Width Modulation (PWM) generator module, a high-frequency signal generator, a digital bandpass filter, a digital notch filter, an envelope detection algorithm module, a data transmission module and a fault diagnosis module, and is configured for the A/D sampling control, the current loop control, the high-frequency voltage signal injection and the corresponding signal processing for the sensorless control, the PWM signal generation and the fault diagnosis of the system.

The sensorless control method for the fault tolerant motor system in lowspeed region includes the following steps:

step 1: injecting a high-frequency sinusoidal voltage signal;

The high-frequency sinusoidal voltages are injected into any two non-faulty phase windings of the motor by superimposing digital high-frequency sinusoidal signals onto given voltages of two corresponding phases acquired by a current loop, wherein the high-frequency voltage applied on the two phase windings is expressed as follows:

$$\begin{cases} U_{Ah} = V_h \sin(\omega_h t + \varphi_A) \\ U_{Bh} = V_h \sin(\omega_h t + \varphi_B) \end{cases} \quad (1)$$

where $U_{Ah}$, $U_{Bh}$ respectively represent the high-frequency voltages applied on the terminals of the non-faulty phase windings A and B of the motor, $V_h$ is the amplitude of the injected high-frequency voltage, $\omega_h$ is the frequency of the injected high-frequency voltage, and $\varphi_A$, $\varphi_B$ represent the initial phase of the injected high-frequency voltage;

according to the high-frequency approximate voltage model of the fault-tolerant permanent magnet motor, the high-frequency voltages are expressed as follows:

$$\begin{cases} U_{Ah} = L_A(\theta_r) \dfrac{di_{Ah}}{dt} \\ U_{Bh} = L_B(\theta_r) \dfrac{di_{Bh}}{dt} \end{cases}, \quad (2)$$

where $L_A(\theta_r)$, $L_B(\theta_r)$ respectively represent the self-inductances of the winding A and the winding B, $\theta_r$ represents the electrical angle of the rotor, and $i_{Ah}$, $i_{Bh}$ represent the high-frequency response currents of the winding A and the winding B, respectively;

from equations (1) and (2), the high-frequency response currents are solved and expressed as follows:

$$\begin{cases} i_{Ah} = F_A(2\omega_r t)\sin(\omega_h t + \varphi_1(\omega_r)) \\ i_{Bh} = F_B(2\omega_r t)\sin(\omega_h t + \varphi_2(\omega_r)) \end{cases}, \quad (3)$$

where $F_A(2\omega_r t)$ and $F_B(2\omega_r t)$ respectively represent the amplitudes of the high-frequency response currents of phase A and phase B, $\omega_r$ is the electrical angular velocity of the rotor, and these parameters have the following approximate relationship with the self-inductances of the winding A and the winding B:

$$\begin{cases} \dfrac{1}{F_A(2\omega_r t)} = \dfrac{\omega_h}{V_h} L_A(2\omega_r t) \\ \dfrac{1}{F_B(2\omega_r t)} = \dfrac{\omega_h}{V_h} L_B(2\omega_r t) \end{cases}; \quad (4)$$

step 2: designing the digital notch filter and the digital bandpass filter in the FPGA system according to the frequency of the injected high-frequency voltage signal;

the designed digital notch filter is used to filter out the high-frequency current response components in the current loop, which is designed according to the frequency of the injected high-frequency voltage signal. Therefore, the digital notch filter has a stop band in a very small frequency band near $\omega_h$ and an amplitude attenuation greater than 50 dB at $\omega_h$, which has almost no amplitude attenuation in other frequency bands and no phase lag;

the designed digital bandpass filter is used to extract the high-frequency response currents, which has a pass-band in a frequency band near $f_h$ and a sufficiently high order for ensuring sufficient attenuation of the stop band;

both the digital notch filter and the digital bandpass filter are required to have the sufficient bandwidth, in which the sampling frequency $f_s$ should meet the following condition:

$$f_s > 2f_{PWM} \quad (5),$$

where $f_{PWM}$ is the PWM chopping frequency;

step 3: detecting the actual currents of the winding A and the winding B by the signal detection circuit, and acquiring the high-frequency response currents $i_{Ah}$ and $i_{Bh}$ of the winding A and the winding B by the digital bandpass filter;

step 4: extracting the amplitude signals $F_A(2\omega_r t)$ and $F_B(2\omega_r t)$ of the high-frequency response current signals $i_{Ah}$ and $i_{Bh}$ by performing the envelope detection thereon respectively, specifically as follows:

in the digital system, the high-frequency response current signal input in the envelope detection is expressed as follows:

$$f(nT_s) = F(nT_s)\cos(\omega_h nT_s + \varphi(nT_s)) = F_I(nT_s)\cos(\omega_h nT_s) - F_Q(nT_s)\sin(\omega_h nT_s) \quad (6)$$

where $F(nT_s)$ represents the amplitude signal of the high-frequency response current, $F_I(nT_s)$ is the in-phase component, $F_Q(nT_s)$ is the quadrature component, n represents the nth sampling point, and $T_s$ represents the sampling period;

a mixing process is first performed, in which the sine and cosine signals with amplitude 2 and frequency $\omega_h$ generated by a digitally controlled oscillator are respectively multiplied with the input high-frequency response current signal. Then a low-pass filtering process is performed, in which a product signal resulted in the mixing process is processed by the low-pass filter. After the mixing process and the low-pass filtering process, the following results are acquired:

$$\begin{cases} I = LPF(f(nT_s) \cdot 2\cos(\omega_h nT_s)) = F_I(nT_s) \\ Q = LPF(f(nT_s) \cdot 2\sin(\omega_h nT_s)) = F_Q(nT_s) \end{cases} \quad (7)$$

where I represents the in-phase component of the amplitude signal $F(nT_s)$, Q represents the quadrature component of the amplitude signal $F(nT_s)$, and LPF ( ) represents the process by a low-pass filter;

the processed signal is then subjected to square sum and square root operations and the following result is acquired:

$$\sqrt{I^2+Q^2} = \sqrt{F_I(nT_s)^2 + F_Q(nT_s)^2} = F(nT_s) \quad (8);$$

consequently, the amplitude information of the input signal is extracted after a process with an envelope detection algorithm;

step 5: acquiring the estimated differential mode inductances $\widehat{L_A}$ and $\widehat{L_B}$ of the winding A and the winding B by conditioning the amplitude signals $F_A(2\omega_r t)$ and $F_B(2\omega_r t)$ of the high-frequency response current signals;

by the equation (4), the estimated self-inductances of the winding A and the winding B are acquired by taking the inverse of $F_A(2\omega_r t)$ and $F_B(2\omega_r t)$ and multiplying the inverse by an appropriate gain, wherein the self-inductance includes a common mode component and a differential mode component; then the estimated differential mode inductances are acquired by measuring the common mode component of the self-inductance and subtracting the common mode component from the self-inductance; and finally the estimated differential mode inductances are properly filtered to filter out the interference signals;

step 6: resolving the estimated rotor electrical angular frequency $\widehat{\omega_r}$ and the double estimated electrical angle $2\widehat{\theta_r}$ by inputting the estimated differential mode inductances $\widehat{L_A}$ and $\widehat{L_B}$ of the non-fault phase windings A and B into the non-orthogonal phase-locked loop, which is composed of a phase detector, a loop filter and a voltage-controlled oscillator;

wherein the estimated differential mode inductance signals $\widehat{L_A}$ and $\widehat{L_B}$ change at a double rotor angular frequency in one sine cycle, including the rotor speed and position information of the fault-tolerant permanent magnet motor;

$\widehat{L_A}$ and $\widehat{L_B}$ are non-orthogonal with a phase difference of 120°; the error related signal between the estimated phase of the input signal and the actual phase of the input signal, i.e., the rotor position estimation error related signal, is acquired by processing the two input estimated inductance signals with the phase detector of the non-orthogonal phase-locked loop; and the following equation is satisfied for the phase detector output $PLL_{err}$ and the rotor position estimation error signal $\theta_{err}$:

$$PLL_{err} = \widehat{L_A} \cdot \cos\left(2\hat{\jmath} - \frac{2\pi}{3}\right) - \widehat{L_B} \cdot \cos(2\hat{\jmath}) = \frac{\sqrt{3}}{2}L\sin(2\theta_{err}) \approx \frac{\sqrt{3}}{2}L \cdot 2\theta_{err}, \quad (9)$$

wherein $\theta_{err}$ represents the error between the estimated rotor position and the actual rotor position, L is a constant characterizing the amplitude of the inductance signal; the loop filter of the non-orthogonal phase-locked loop uses a PI controller, the rotor position estimation error-related signal $PLL_{err}$ input into the loop filter is PI-modulated, and the double estimated rotor electrical angular frequency $2\widehat{\omega_r}$ and thus $\widehat{\omega_r}$ are acquired after the modulating becomes stable; the double estimated electrical angle $2\widehat{\theta_r}_r$ is acquired by processing the $2\widehat{\omega_r}$ by an integrator of the voltage-controlled oscillator of the non-orthogonal phase-locked loop; and the PI parameters of the PI controller of the loop filter are the design parameters of the non-orthogonal phase-locked loop, and the PI parameters need the reasonable design and tuning for ensuring the stability and rapidity of the non-orthogonal phase-locked loop;

step 7: determining the polarity of the rotor permanent magnet of the fault-tolerant permanent magnet motor based on acceleration, resolving the estimated electrical angle $\widehat{\theta_r}_r$ of the rotor, and performing the fixed compensation for the estimated rotor position;

It is necessary to discriminate the polarity of the rotor permanent magnet for determining $\widehat{\theta_r}$, due to the possible presence of a deviation of 180° between the value acquired by dividing the double estimated electrical angle $2\widehat{\theta_r}$ resolved by the non-orthogonal phase-locked loop by 2 and the actual rotor position;

The discrimination of the polarity of the rotor permanent magnet is performed only when the motor is started;

The fixed compensation is performed on the estimated rotor inductance acquired from the phase-locked loop for ensuring control accuracy, since the phase of the estimated differential mode inductance signal lags behind its actual value due to the use of the filter.

Preferably, the fault-tolerant permanent magnet motor can be operated in the failure mode of an open circuit fault and/or a short circuit fault for a phase winding.

Preferably, determining the polarity of the rotor permanent magnet is performed specifically as follows: before the motor is started, causing the motor to operate on a trial basis according to the currently initially rotor position estimated by the non-orthogonal phase-locked loop for a short time (milliseconds); discriminating the polarity of the permanent magnet by determining an acceleration direction of the rotor during a short time, then determining that the estimated rotor electrical angle is $2\widehat{\theta_r}/2$ if the acceleration direction coincides with the excitation current, while determining that the estimated rotor electrical angle is $$\frac{2\widehat{\theta_r}}{2} + \pi$$

if the acceleration direction does not coincide with the excitation current.

Preferably, the isolation drive circuit is composed of a gate isolation drive chip and its peripheral circuits, which is used for the isolation between the strong electrical signal of the power driver and the weak electrical signal of the digital controller for PWM control, and for the power amplification of the PWM control signal generated by the FPGA system for driving and controlling turn-on and turn-off of power Metal-Oxide-Semiconductor Field-Effect Transistors (MOSFETs).

Preferably, the fault-tolerant power drive circuit is implemented by an H-bridge power drive circuit based on power MOSFETs, and each phase winding of the fault-tolerant permanent magnet motor is driven and powered by a single H-bridge power drive circuit separately.

Preferably, the signal detection circuit includes a current sensor, a signal conditioning circuit and an A/D conversion circuit; the current sensor is used to detect the phase current of each phase winding of the fault-tolerant permanent magnet motor and provides an output in the form of a voltage signal; the signal conditioning circuit is used to perform a low-pass filtering process and a signal level conversion process on the output from the current sensor, and output an analog signal to the A/D conversion circuit; and the A/D conversion circuit is used to convert the analog signal into a digital signal and send the digital signal to the FPGA system. By injecting the high-frequency voltage signals in the two non-faulty phase windings and processing the corresponding phase current signals through the FPGA system and the DSP system, the differential mode inductance signals of the two non-faulty phase windings are finally resolved in the DSP system. Based on the obtained differential mode inductance signals, the high precision sensorless resolving for the motor is completed, in which the rotor position and speed of the motor in a low-speed region can be estimated, regardless of the fault state and the non-fault state. The given value of the motor electromagnetic torque is acquired by the DSP system through the calculation of the speed loop controller in the DSP system according to the estimated motor speed and the control instruction signal from the host computer. The given values of the current instruction of the non-faulty phase windings of the motor are calculated by the fault-tolerant controller in the DSP system according to the given value of the motor electromagnetic torque instruction and the current fault state of the motor system, and is then sent to the FPGA system; Finally, the FPGA system performs the current loop control and the PWM generation.

Preferably, the DSP system is implemented by a floating-point high-speed DSP with a type number of TMS320F28335 with a main frequency of 150 MHz and a single-precision floating-point processing unit.

Preferably, the FPGA system includes a FPGA chip having a type number of EP2C35F484 with a main frequency of 100 MHz, 33216 logics units, 105 M4K memory blocks, 35 multipliers, and 322 configurable I/O pins.

Preferably, the MOSFET devices in the fault-tolerant power drive circuit have a type number of IXTP90N075T2, which has the small on-state loss, small volume and weight, and high power density.

Preferably, the sensorless control method in low-speed region is applied in the fault-tolerant permanent magnet motor system for electric actuators.

Beneficial effects of the present disclosure are as follows:

The present disclosure provides a high-precision position sensorless control method for the fault-tolerant permanent magnet motor system operating in the low-speed region based on high-frequency voltage injection into two non-faulty phase windings. Through the real-time observation of differential mode inductance signals of any two non-faulty phase windings, the rotor position and speed of the motor at standstill or in low-speed operation can be estimated from the obtained two phase inductances by the non-orthogonal phase-locked loop. The position sensorless control method does not rely on coordinate transformation and does not require the symmetrical operation of phase windings, and thus can be appliable for the high-precision control of the fault-tolerant permanent magnet motor operating at low-speeds in both the fault state and the non-fault state, thereby improving the accuracy and reliability of the motor position/speed detection.

The high-reliability position sensorless drive controller of the fault-tolerant permanent magnet motor system for electric actuators adopts the drive structure in which each phase winding is separately powered by an H-bridge inverter, and the core processor architecture based on DSP and FPGA, thereby improving the fault isolation capability and fault-tolerant control performance of the system.

In addition, the power switch transistors of the drive controller have a small conduction impedance, which effectively reduces the conduction loss; and the transistor is small in size, easy in installation, and high in power density.

The present disclosure provides a position sensorless control method of the fault-tolerant permanent magnet motor system operating in the low-speed region for the electric actuator, which can improve the fault isolation capability and the control performance of the drive controller of the fault-tolerant permanent magnet motor even in fault tolerant operation condition by the proposed control strategy and structural module design on the FPGA system. The control method of the present disclosure has strong reliability, high system efficiency, and small size, which can effectively meet the performance requirements of onboard electric actuators.

DETAILED DESCRIPTION

A specific embodiment of technical solutions of the present disclosure will be described in detail below with reference to FIGS. 1-6.

Figure 1:
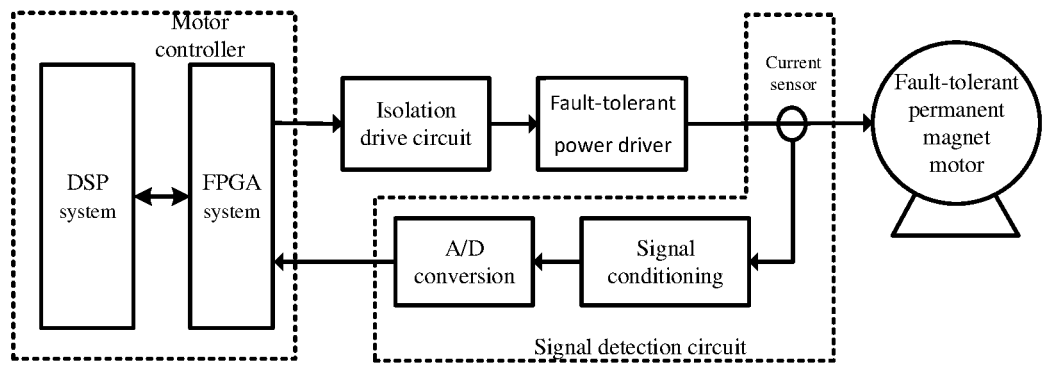
FIG. 1 is a schematic diagram of the overall structure of the fault-tolerant permanent magnet motor system for an onboard electric actuator according to the present disclosure.

FIG. 1 shows the block diagram of the high-reliability drive controller of the fault-tolerant permanent magnet motor for the onboard electric actuator according to the present disclosure. The drive controller includes a floating-point high-speed DSP system, a large-scale programmable logic gate array FPGA system, an isolation drive circuit, a fault-tolerant power drive circuit and a signal detection circuit. The DSP system is implemented by a floating-point high-speed DSP with a type number of TMS320F28335 with a main frequency of 150 MHz, and a single-precision floating-point number processing unit. The FPGA system is composed of an FPGA chip and its peripheral circuits, and the FPGA chip has a type number of EP2C35F484 (Cyclone II series, from ALTERA) with a main frequency of 100 MHz, 33216 logics units, 35 multipliers, 322 configurable I/O pins. The MOSFET devices in the fault-tolerant power drive circuit have a type number of IXTP90N075T2, which has small conduction loss, small volume and weight, and high power density.

The high-reliability drive controller of the fault-tolerant permanent magnet motor system for electric actuators is able to estimate the motor rotor position and speed information by: injecting the high-frequency voltage signals into two non-faulty phase windings of the motor, acquiring the corresponding current signals of the phase windings by the signal detection circuit, resolving the current response signals of the high-frequency injection phases in the FPGA and the DSP through the signal detection circuit, and accurately estimating the motor rotor position and speed information through the high-precision sensorless control algorithm. The motor controller performs the following processes: acquiring the given instruction of electromagnetic torque through the calculation of the speed loop controller according to the estimated speed and the speed instruction from a host computer; calculating the given current instruction of the non-faulty phase of the motor by the fault-tolerant controller according to the given instruction of electromagnetic torque, the estimated position and the fault state of the system; calculating the given voltages of the non-fault phases by the current loop resolution according to the given current instruction and the current feedback value detected by the signal detection circuit, wherein the given voltages of the two non-faulty phase windings as high-frequency injection phases are necessarily superimposed with the high-frequency voltage signal generated by the high-frequency signal generator; and finally generating the PWM control instruction by the PWM generator module. The PWM control instruction is amplified in power by the isolation drive circuit and the amplified instruction is transmitted to the fault-tolerant power driver for controlling the turn-on and turn-off of power switch transistors thereof, so as to achieve the sensorless control of the fault-tolerant permanent magnet motor and ensure the smooth operation thereof under fault or non-fault conditions.

Figure 2:
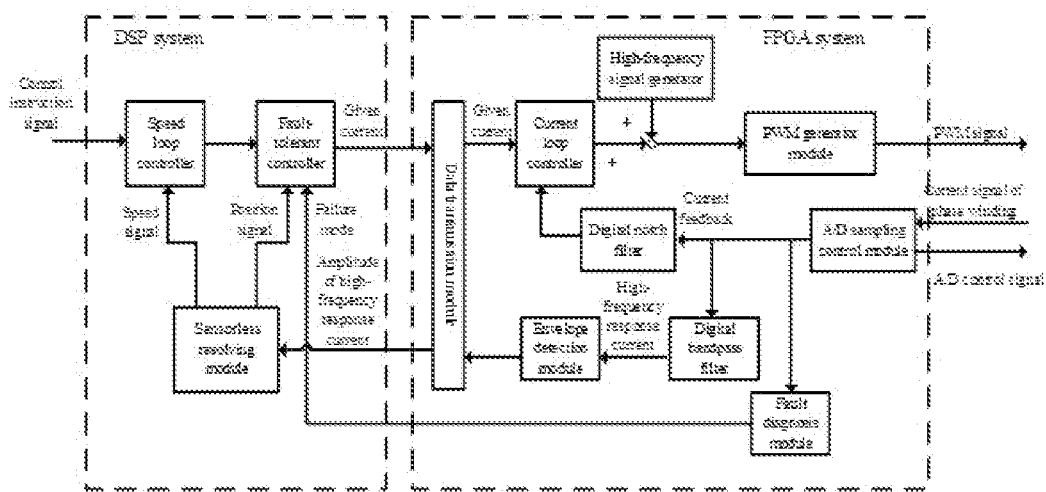
FIG. 2 is a schematic diagram of component modules and functions of the FPGA system and the DSP system according to the present disclosure.

As shown in FIG. 2, the main functions of the FPGA system include: controlling the current sampling by the A/D sampling control module; performing the fault diagnosis for the fault-tolerant permanent magnet motor system; filtering the sampled current; acquiring the amplitude information of the high-frequency currents by detecting the envelopes of high-frequency response currents; acquiring the given voltage instruction by the calculation of the current loop controller according to the given current instruction input from the DSP and the current feedback value measured by the A/D sampling control module; acquiring the new given voltages of the corresponding phase windings by superimposing the high-frequency voltage signals generated by the high-frequency signal generator onto the given voltages of the corresponding phase windings; and calculating the PWM control signals of the power switch transistors of respective phase windings by the PWM generator module according to the input given voltage signals of respective phases.

The DSP system is composed of a DSP chip and its peripheral circuits. The DSP chip is implemented by a 32-bit floating-point DSP with a type number of TMS320F28335 (from TI Inc. of US) with a main frequency of 150 MHz, and a 32-bit floating-point processing unit. As shown in FIG. 2, the main functions of the DSP system include: estimating the real time rotor position and speed values of the motor in the low-speed region of the fault-tolerant permanent magnet motor system under fault and non-fault conditions by resolution of the high-precision sensorless controller according to the amplitude signals of the high-frequency response currents resolved by the FPGA system; acquiring the given values of electromagnetic torque by the calculation of the speed loop controller according to the speed control instruction from a host computer and the estimated speed value; and acquiring the given current instruction of the non-faulty windings of the motor by the calculation of the fault-tolerant controller according to the given values of the electromagnetic torque and the estimated rotor position, combined with the failure mode given by the FPGA, and transmitting the given current instruction to the FPGA.

Figure 3:
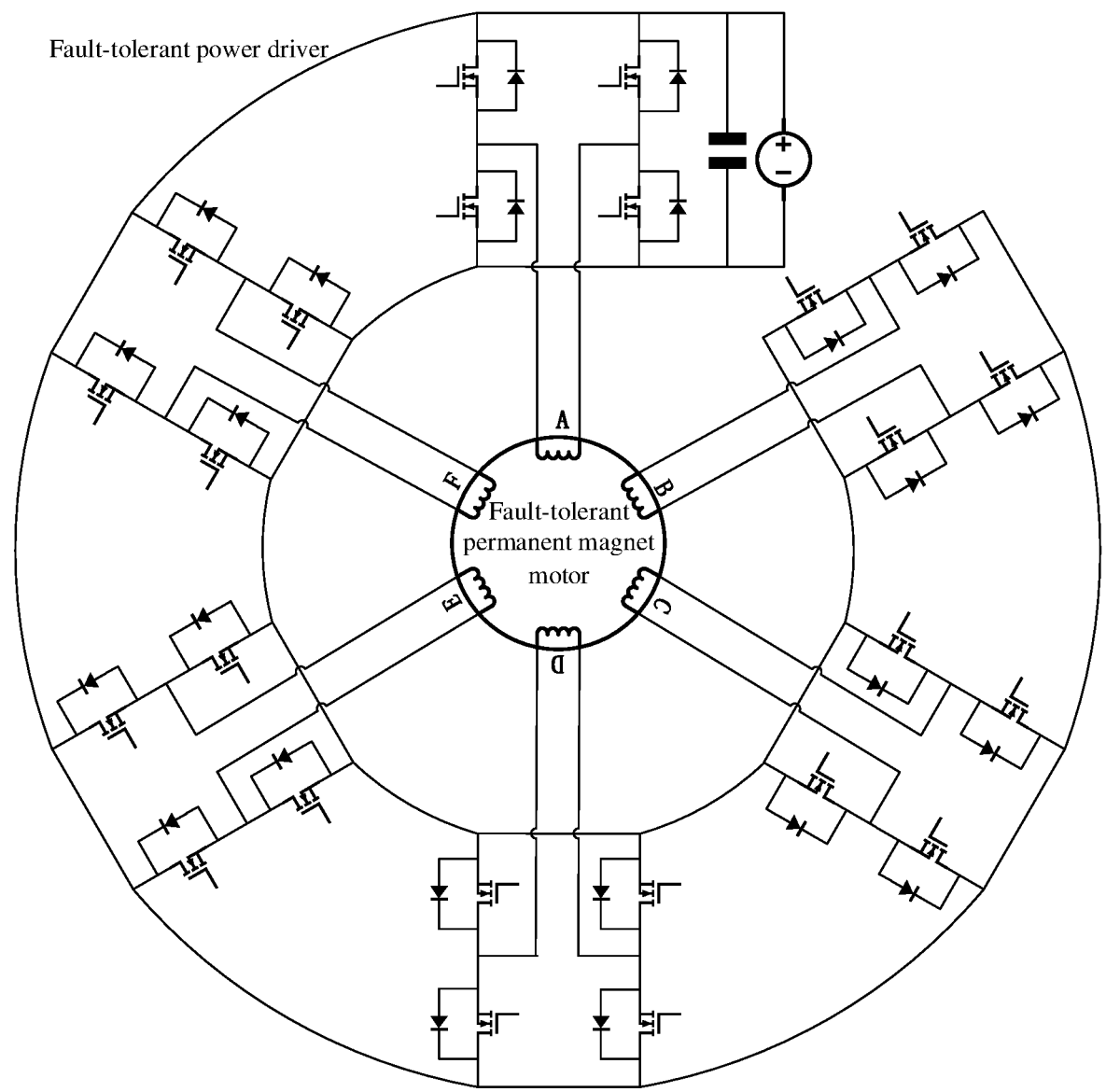
FIG. 3 is a schematic diagram of the structure of the fault-tolerant power drive circuit according to the present disclosure.

As shown in FIG. 3, the fault-tolerant power driver is composed of the H-bridge drive circuit, and each phase winding of the fault-tolerant permanent magnet motor is driven and powered by one H-bridge drive circuit separately. The power devices of the H-bridge drive circuit are implemented by an N-channel enhancement MOSFET (from IXYS Inc. of US) with a type number of IXTP90N075T2 with the withstand voltage of 75V, the maximum current of 90 A, on-resistance of less than 10 mΩ, which is small in size, low in loss and high in power density, and so on.

Figure 4:
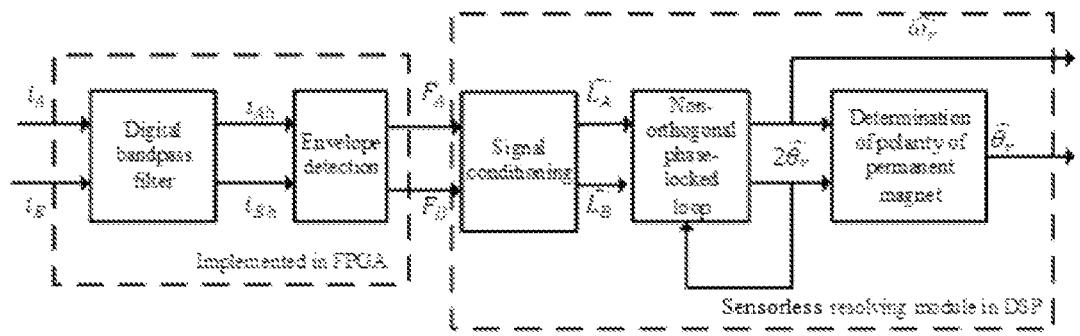
FIG. 4 is a schematic diagram of the structure of the position sensorless high-precision control algorithm based on envelope detection and non-orthogonal phase-locked loop according to the present disclosure.
Figure 5:
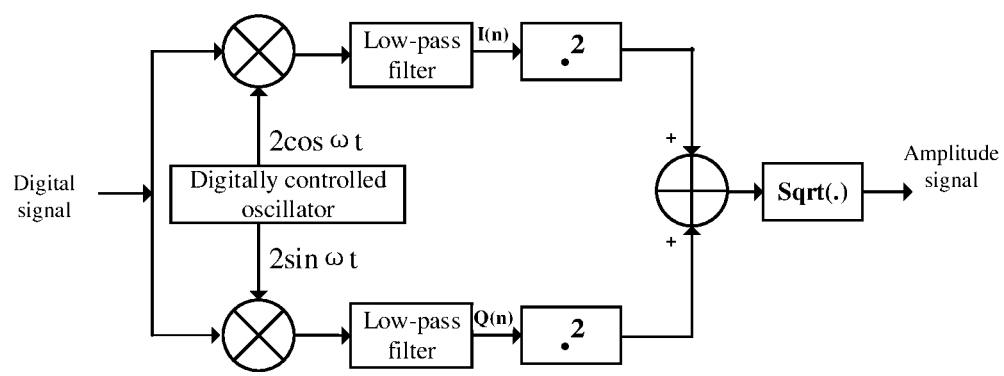
FIG. 5 is a schematic diagram of the specific algorithm of the envelope detection algorithm according to the present disclosure.
Figure 6:
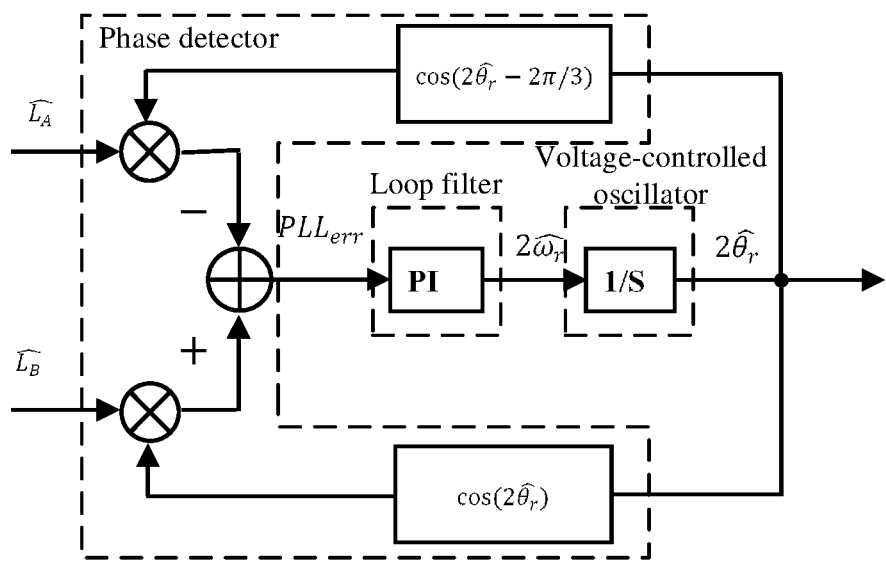
FIG. 6 is a schematic diagram of the specific algorithm of the non-orthogonal phase-locked loop according to the present disclosure.

The overall sensorless control algorithm for the motor speed/position detection is shown in FIG. 4. The estimated differential mode inductance signals of two non-faulty phase windings are acquired by: injecting the high-frequency voltages into the two non-faulty phase windings; detecting the currents of the two phase windings by the signal detection circuit; extracting the high-frequency response current components in the detected currents by the bandpass filter; acquiring the amplitude signals of the high-frequency response currents by performing the envelope detection on the high-frequency response current components; and conditioning the amplitude signals. The differential mode inductance signal contains the rotor speed/position information of the double frequency, and is input to the non-orthogonal phase-locked loop for resolution by which the estimated values of the double speed/position are acquired. Finally, the estimated rotor speed/position of the motor can be acquired after the discrimination of the polarity of the rotor permanent magnet.

The isolation drive circuit is mainly composed of a gate isolation drive chip and peripheral circuits thereof. The isolation drive circuit has two functions: implementing the electrical isolation between the strong electrical signal of the fault-tolerant power driver and the weak electrical signal of the PWM controller, thereby improving the stability of the system; and performing the power amplification for the PWM signal generated by the FPGA system. The gate isolation drive chip is implemented by an isolation-type high-precision half-bridge driver with a type number of ADuM7234 (from ADI Inc.), which isolates the high voltage side and the low voltage side by the magnetic isolation technologies, and has the good isolation performance, a high operation frequency up to 1 MHz, the strong anti-interference ability, the high temperature resistance, and the small size.

The signal detection circuit includes a current sensor, a signal conditioning circuit and an A/D (analog-to-digital) converter. The current sensor is configured to detect the currents of respective phases of the fault-tolerant permanent magnet motor. The current sensor is implemented by a voltage-type Hall current sensor with a type number of LTS 15-NP (from LEM Inc.), which has the fast response speed, the high precision, the strong anti-interference ability, the good linearity, and the small temperature drift. The signal conditioning circuit is composed of the operational amplifiers, the resistors and the capacitors, and is configured for applying the filtering and the level conversion processing on the signals acquired by the current sensor. The A/D converter is configured to convert the conditioned current analog signal into a digital signal to be sent to the FPGA system. The A/D converter includes an A/D converter chip implemented by an AD7606 chip (from ADI Inc.), which is an 8-channel synchronous sampling data acquisition chip with 14-bit conversion accuracy.

The position sensorless control method in low-speed region includes the following steps:

step 1: injecting the high-frequency sinusoidal voltage signal;

the high-frequency sinusoidal voltages are injected into two non-faulty phase windings by superimposing the digital high-frequency sinusoidal signals onto the given voltages of two corresponding phases acquired by the current loop, wherein the high-frequency voltages applied on the two phase windings are expressed as follows:

$$\begin{cases} U_{Ah} = V_h \sin(\omega_h t + \varphi_A) \\ U_{Bh} = V_h \sin(\omega_h t + \varphi_B) \end{cases} \quad (1)$$

where $U_{Ah}$, $U_{Bh}$ respectively represent the high-frequency voltages applied on the terminals of non-faulty phase windings A and B of the motor, $V_h$ is the amplitude of the injected high-frequency voltage, $\omega_h$ is the frequency of the injected high-frequency voltage, and $\varphi_A$, $\varphi_B$ represent the initial phase of the injected high-frequency voltage;

according to the high-frequency approximate voltage model of the fault-tolerant permanent magnet motor, the high-frequency voltages are expressed as follows:

$$\begin{cases} U_{Ah} = L_A(\theta_r) \dfrac{di_{Ah}}{dt} \\ U_{Bh} = L_B(\theta_r) \dfrac{di_{Bh}}{dt} \end{cases}, \quad (2)$$

where $L_A(\theta_r)$, $L_B(\theta_r)$ respectively represent the self-inductances of the winding A and the winding B, $\theta_r$ represents the electrical angle of the rotor, and $i_{Ah}$, $i_{Bh}$ represents the high-frequency response currents of the winding A and the winding B, respectively;

from equations (1) and (2), the high-frequency response currents are solved and expressed as follows:

$$\begin{cases} i_{Ah} = F_A(2\omega_r t)\sin(\omega_h t + \varphi_1(\omega_r)) \\ i_{Bh} = F_B(2\omega_r t)\sin(\omega_h t + \varphi_2(\omega_r)) \end{cases}, \quad (3)$$

where $F_A(2\omega_r t)$ and $F_B(2\omega_r t)$ respectively represent the amplitudes of the high-frequency response currents of phase A and phase B, $\omega_r$ is the electrical angular velocity of the rotor, and these parameters have the following approximate relationship with the self-inductances of the winding A and the winding B:

$$\begin{cases} \dfrac{1}{F_A(2\omega_r t)} = \dfrac{\omega_h}{V_h} L_A(2\omega_r t) \\ \dfrac{1}{F_B(2\omega_r t)} = \dfrac{\omega_h}{V_h} L_B(2\omega_r t) \end{cases}; \quad (4)$$

step 2: designing the digital notch filter and the digital bandpass filter in the FPGA system according to the frequency of the injected high-frequency voltage signal;

The designed digital notch filter is configured to filter out the high-frequency current response components in the current loop control signal and is designed according to the frequency of the injected high-frequency voltage signal; and the digital notch filter has a stop band in a very small frequency band near $\omega_h$, and the amplitude attenuation greater than 50 dB at $\omega_h$, and has almost no amplitude attenuation in other frequency bands and no phase lag;

the designed digital bandpass filter is configured to extract the high-frequency response currents, and has a pass-band in the frequency band near $\omega_h$ and a sufficiently high order for ensuring sufficient attenuation of the stop band;

both the digital notch filter and the digital bandpass filter have the sufficient bandwidth and have the sampling frequency $f_s$ meeting the following condition:

$$f_s > 2 f_{PWM} \quad (5),$$

where $f_{PWM}$ is the PWM chopping frequency;

step 3: detecting the actual currents of the winding A and the winding B by the signal detection circuit, and acquiring the high-frequency response currents $i_{Ah}$ and $i_{Bh}$ of the winding A and the winding B by the digital bandpass filter;

step 4: extracting the amplitude signals $F_A(2\omega_r t)$ and $F_B(2\omega_r t)$ of the high-frequency response current signals $i_{Ah}$ and $i_{Bh}$ by performing the envelope detection thereon respectively, specifically as follows:

in the digital system, the high-frequency response current signal input in the envelope detection can be expressed as follows:

$$f(nT_s) = F(nT_s)\cos(\omega_h nT_s + \varphi(nT_s)) = F_I(nT_s)\cos(\omega_h nT_s) - F_Q(nT_s)\sin(\omega_h nT_s) \quad (6),$$

where $F(nT_s)$ represents the amplitude signal of the high-frequency response current, $F_I(nT_s)$ is the in-phase component, $F_Q(nT_s)$ is the quadrature component, n represents the nth sampling point, and $T_s$ represents the sampling period;

a mixing process is performed, in which the sine and cosine signals with amplitude 2 and frequency $\omega_h$ generated by a digitally controlled oscillator are respectively multiplied with the input high-frequency response current signal. A low-pass filtering process is then performed, in which a product signal resulted in the mixing process is processed by the low-pass filter. After the mixing process and the low-pass filtering process, the following results are acquired:

$$\begin{cases} I = LPF(f(nT_s) \cdot 2\cos(\omega_h nT_s)) = F_I(nT_s) \\ Q = LPF(f(nT_s) \cdot 2\sin(\omega_h nT_s)) = F_Q(nT_s) \end{cases}, \quad (7)$$

where I represents the in-phase component of the amplitude signal $F(nT_s)$, Q represents the quadrature component of the amplitude signal $F(nT_s)$, and LPF( ) represents the process by a low-pass filter;

the processed signal is then subjected to the square sum and square root operations and the following result is acquired:

$$\sqrt{I^2 + Q^2} = \sqrt{F_I(nT_s)^2 + F_Q(nT_s)^2} = F(nT_s) \quad (8);$$

consequently, the amplitude information of the input signal is extracted after the process with the envelope detection algorithm;

step 5: acquiring the estimated differential mode inductances $\widehat{L_A}$ and $\widehat{L_B}$ of the winding A and the winding B by conditioning the amplitude signals $F_A(2\omega_r t)$ and $F_B(2\omega_r t)$ of the high-frequency response current signals;

by the equation (4), the estimated self-inductances of the winding A and the winding B are acquired by taking the inverse of $F_A(2\omega_r t)$ and $F_B(2\omega_r t)$ and multiplying the inverse by an appropriate gain, wherein the self-inductance includes a common mode component and a differential mode component; then the estimated differential mode inductances are acquired by measuring the common mode component of the self-inductance and subtracting the common mode component from the self-inductance; and finally the estimated differential mode inductances are properly filtered to filter out the interference signals;

step 6: resolving the estimated rotor electrical angular frequency $\widehat{\omega_r}$ and the double estimated electrical angle 2 $\widehat{\theta_r}$ by inputting the estimated differential mode inductances $\widehat{L_A}$ and $\widehat{L_B}$ of the non-fault phase windings A and B into the non-orthogonal phase-locked loop, which is composed of a phase detector, a loop filter and a voltage-controlled oscillator;

wherein the estimated differential mode inductance signals $\widehat{L_A}$ and $\widehat{L_B}$ change at a double rotor angular frequency in one sine cycle, including the speed and position information of the fault-tolerant permanent magnet motor; $\widehat{L_A}$ and $\widehat{L_B}$ are non-orthogonal with a phase difference of 120°; the error related signal between the estimated phase of the input signal and the actual phase of the input signal, i.e., the rotor position estimation error related signal, can be acquired by processing the two input estimated inductance signals with the phase detector of the non-orthogonal phase-locked loop; and the following equation is satisfied for the phase detector output $PLL_{err}$ and the rotor position estimation error signal $\theta_{err}$:

$$PLL_{err} = \widehat{L_A} \cdot \cos\left(2\hat{\theta} - \frac{2\pi}{3}\right) - \widehat{L_B} \cdot \cos(2\hat{\theta}) = \frac{\sqrt{3}}{2} L \sin(2\theta_{err}) \approx \frac{\sqrt{3}}{2} L \cdot 2\theta_{err}, \quad (9)$$

where $\theta_{err}$ represents the error between the estimated rotor position and the actual rotor position, L is a constant characterizing the amplitude of the inductance signal; the loop filter of the non-orthogonal phase-locked loop uses a PI controller, the rotor position estimation error-related signal $PLL_{err}$ input into the loop filter is PI-modulated, and the double estimated rotor electrical angular frequency $2\widehat{\omega_r}$ and thus $\widehat{\omega_r}$ are acquired after the modulating becomes stable; the double estimated electrical angle $2\widehat{\omega_r}$ is acquired by processing the $2\widehat{\omega_r}$ by an integrator of the voltage-controlled oscillator of the non-orthogonal phase-locked loop; and the PI parameters of the PI controller of the loop filter are the design parameters of the non-orthogonal phase-locked loop, and the PI parameters need the reasonable design and tuning for ensuring the stability and rapidity of the non-orthogonal phase-locked loop;

step 7: discriminating the polarity of the rotor permanent magnet of the fault-tolerant permanent magnet motor based on the acceleration, resolving the estimated electrical angle $\widehat{\theta_r}$ of the rotor, and performing the fixed compensation for the estimated rotor position;

it is necessary to discriminate the polarity of the rotor permanent magnet for determining $\widehat{\theta_r}$, due to the possible presence of a deviation of 180° between the value acquired by dividing the double estimated electrical angle 2 $\widehat{\theta_r}$ resolved by the non-orthogonal phase-locked loop by 2 and the actual rotor position;

the discrimination of the polarity of the rotor permanent magnet is performed only when the motor is started; discriminating the polarity of the rotor permanent magnet is performed specifically as follows: before the motor is started, causing the motor to operate on a trial basis according to the currently initially rotor position estimated by the non-orthogonal phase-locked loop for a short time (milliseconds); discriminating the polarity of the permanent magnet by determining the acceleration direction of the rotor during the short time, then determining that the estimated rotor electrical angle is $2\widehat{\theta_r}/2$ if the acceleration direction coincides with an excitation current, while determining that the estimated rotor electrical angle is $$\frac{2\widehat{\theta}_r}{2} + \pi$$

if the acceleration direction does not coincide with the excitation current.

The fixed compensation is performed on the estimated rotor inductance acquired from the phase-locked loop for ensuring the control accuracy, since the phase of the estimated differential mode inductance signal lags behind the actual value due to the use of the filter.

The fault-tolerant permanent magnet motor can be operated in the fault modes of an open circuit fault and/or a short circuit fault for a phase winding.

In addition, it should be understood that although this specification is described in accordance with embodiments, each embodiment includes more than one independent technical solution. This description manner in the specification is only for clarity, and those skilled in the art should consider the specification as a whole. The technical solutions in the embodiments may also be appropriately combined to form other embodiments that may be understood by those skilled in the art.

What is claimed is:

1. A position sensorless control method in low-speed region of a fault-tolerant permanent magnet motor system based on envelope detection and a non-orthogonal phase-locked loop, wherein the fault-tolerant permanent magnet motor system comprises a fault-tolerant permanent magnet motor, a signal detection circuit, an isolation drive circuit, a fault-tolerant power drive circuit, a DSP system and an FPGA system; the DSP system comprises a speed loop controller, a fault-tolerant controller and a sensorless resolving module, and the DSP system is configured for speed loop control, the calculation of a fault-tolerant current given instruction, the conditioning of an estimated inductance signal, and the resolving of a rotor position and a speed based on differential mode inductance of two phase windings of the system;

wherein the FPGA system comprises a current A/D sampling control module, a current loop controller, a PWM generator module, a high-frequency signal generator, a digital bandpass filter, a digital notch filter, an envelope detection algorithm module, a data transmission module and a fault diagnosis module, and the FPGA system is configured for the A/D sampling control, the current loop control, the high-frequency voltage signal injection and the corresponding signal processing for sensorless control, PWM signal generation and system fault diagnosis;

the sensorless control method in low-speed region comprises the following steps:

step 1: injecting the high-frequency sinusoidal voltage signals;

the high-frequency sinusoidal voltages are injected into any two non-faulty phase windings of the motor by superimposing digital high-frequency sinusoidal signals onto given voltages of two corresponding phases acquired by a current loop, wherein the high-frequency voltages applied on the two phase windings are expressed as follows:

$$\begin{cases} U_{Ah} = V_h\sin(\omega_h t + \varphi_A) \\ U_{Bh} = V_h\sin(\omega_h t + \varphi_B) \end{cases}, \quad (1)$$

where $U_{Ah}$, $U_{Bh}$ respectively represent the high-frequency voltages applied on terminals of non-faulty phase windings A and B of the motor, $V_h$ is the amplitude of the injected high-frequency voltage, $\omega_h$ is the frequency of the injected high-frequency voltage, and $\varphi_A$, $\varphi_B$ represent the initial phase of the injected high-frequency voltage;

according to the high-frequency approximate voltage model of the fault-tolerant permanent magnet motor, the high-frequency voltages are expressed as follows:

$$\begin{cases} U_{Ah} = L_A(\theta_r)\dfrac{di_{Ah}}{dt} \\ U_{Bh} = L_B(\theta_r)\dfrac{di_{Bh}}{dt} \end{cases}, \quad (2)$$

where $L_A(\theta_r)$, $L_B(\theta_r)$ respectively represent the self-inductances of the winding A and the winding B, $\theta_r$ represents the electrical angle of the rotor, and $i_{Ah}$, $i_{Bh}$ represent the high-frequency response currents of the winding A and the winding B, respectively;

from equations (1) and (2), the high-frequency response currents are solved and expressed as follows:

$$\begin{cases} i_{Ah} = F_A(2\omega_r t)\sin(\omega_h t + \varphi_1(\omega_r)) \\ i_{Bh} = F_B(2\omega_r t)\sin(\omega_h t + \varphi_2(\omega_r)) \end{cases}, \quad (3)$$

where $F_A(2\omega_r t)$ and $F_B(2\omega_r t)$ respectively represent the amplitudes of the high-frequency response currents of phase A and phase B, $\omega_r$ is the electrical angular velocity of the rotor, and these parameters have the following approximate relationship with the self-inductances of the winding A and the winding B:

$$\begin{cases} \dfrac{1}{F_A(2\omega_r t)} = \dfrac{\omega_h}{V_h}L_A(2\omega_r t) \\ \dfrac{1}{F_B(2\omega_r t)} = \dfrac{\omega_h}{V_h}L_B(2\omega_r t) \end{cases}; \quad (4)$$

step 2: designing the digital notch filter and the digital bandpass filter in the FPGA system according to the frequency of the injected high-frequency voltage signal;

the designed digital notch filter is configured to filter out the high-frequency current response components in the current loop control signal and is designed according to the frequency of the injected high-frequency voltage signal; and the digital notch filter has a stop band in a very small frequency band near $\omega_h$ and the amplitude attenuation greater than 50 dB at $\omega_h$, and has almost no amplitude attenuation in other frequency bands and no phase lag;

the designed digital bandpass filter is configured to extract the high-frequency response currents, and has a passband in the frequency band near $\omega_h$ and a sufficiently high order for ensuring sufficient attenuation of the stop band;

both the digital notch filter and the digital bandpass filter have the sufficient bandwidth and have the sampling frequency $f_s$ meeting the following condition:

$$f_s > 2f_{PWM} \quad (5),$$

where $f_{PWM}$ is the PWM chopping frequency;

step 3: detecting the actual currents of the winding A and the winding B by the signal detection circuit, and acquiring the high-frequency response currents $i_{Ah}$ and $i_{Bh}$ of the winding A and the winding B by the digital bandpass filter;

step 4: extracting the amplitude signals $F_A(2\omega_r t)$ and $F_B(2\omega_r t)$ of the high-frequency response current signals $i_{Ah}$ and $i_{Bh}$ by performing the envelope detection thereon respectively, specifically as follows:

in a digital system, the high-frequency response current signal input in the envelope detection is expressed as follows:

$$f(nT_s)=F(nT_s)\cos(\omega_h nT_s+\varphi(nT_s))=F_I(nT_s)\cos(\omega_h nT_s)-F_Q(nT_s)\sin(\omega_h nT_s) \quad (6)$$

where $F(nT_s)$ represents the amplitude signal of the high-frequency response current, $F_I(nT_s)$ is the in-phase component, $F_Q(nT_s)$ is the quadrature component, n represents the nth sampling point, and $T_s$ represents the sampling period;

a mixing process is performed, in which the sine and cosine signals with amplitude 2 and frequency $\omega_h$ generated by a digitally controlled oscillator are respectively multiplied with the input high-frequency response current signal, and a low-pass filtering process is performed, in which a product signal resulted in the mixing process is processed by a low-pass filter; after the mixing process and the low-pass filtering process, the following results are acquired:

$$\begin{cases} I = LPF(f(nT_s) \cdot 2\cos(\omega_h nT_s)) = F_I(nT_s) \\ Q = LPF(f(nT_s) \cdot 2\sin(\omega_h nT_s)) = F_Q(nT_s) \end{cases}, \quad (7)$$

where I represents the in-phase component of the amplitude signal $F(nT_s)$, Q represents the quadrature component of the amplitude signal $F(nT_s)$, and LPF( ) represents the process by a low-pass filter;

the processed signal is then subjected to square sum and square root operations and the following result is acquired:

$$\sqrt{I^2+Q^2}=\sqrt{F_I(nT_s)^2+F_Q(nT_s)^2}=F(nT_s) \quad (8);$$

consequently, the amplitude information of the input signal is extracted after the process with the envelope detection algorithm;

step 5: acquiring the estimated differential mode inductances $\widehat{L_A}$ and $\widehat{L_B}$ of the winding A and the winding B by conditioning the amplitude signals $F_A(2\omega_r t)$ and $F_B(2\omega_r t)$ of the high-frequency response current signals;

by the equation (4), estimated the self-inductances of the winding A and the winding B are acquired by taking the inverse of $F_A(2\omega_r t)$ and $F_B(2\omega_r t)$ and multiplying the inverse by an appropriate gain, wherein the self-inductance comprises a common mode component and a differential mode component; then the estimated differential mode inductances are acquired by measuring the common mode component of the self-inductance and subtracting the common mode component from the self-inductance; and finally the estimated differential mode inductances are properly filtered to filter out the interference signals;

step 6: resolving the estimated rotor electrical angular frequency $\widehat{\omega_r}$ and the double estimated electrical angle $2\widehat{\theta_r}$ by inputting the estimated differential mode inductances $\widehat{L_B}$ and $\widehat{L_B}$ of the non-fault phase windings A and B into the non-orthogonal phase-locked loop, which is composed of a phase detector, a loop filter and a voltage-controlled oscillator;

wherein the estimated differential mode inductance signals $\widehat{L_A}$ and $\widehat{L_B}$ change at the double rotor angular frequency in one sine cycle, including the speed and position information of the fault-tolerant permanent magnet motor; $\widehat{L_A}$ and $\widehat{L_B}$ are non-orthogonal with a phase difference of 120°; the error related signal between the estimated phase of the input signal and the actual phase of the input signal, i.e., the rotor position estimation error related signal, is acquired by processing two input estimated inductance signals with the phase detector of the non-orthogonal phase-locked loop; and the following equation is satisfied for the phase detector output $PLL_{err}$ and the rotor position estimation error signal $\theta_{err}$:

$$PLL_{err} = \widehat{L_A} \cdot \cos\left(2\hat{\theta} - \frac{2\pi}{3}\right) - \widehat{L_B} \cdot \cos(2\hat{\theta}) = \frac{\sqrt{3}}{2}L\sin(2\theta_{err}) \approx \frac{\sqrt{3}}{2}L \cdot 2\theta_{err}, \quad (9)$$

where $\theta_{err}$ represents the error between the estimated rotor position and the actual rotor position, L is a constant characterizing the amplitude of inductance signal; the loop filter of the non-orthogonal phase-locked loop uses a PI controller, the rotor position estimation error-related signal $PLL_{err}$ input into the loop filter is PI-modulated, and the double estimated rotor electrical angular frequency $2\widehat{\omega_r}$ and thus $\widehat{\omega_r}$ are acquired after the modulating becomes stable; the double estimated electrical angle $2\widehat{\theta_r}$ is acquired by processing the $2\widehat{\omega_r}$ by an integrator of the voltage-controlled oscillator of the non-orthogonal phase-locked loop; and the PI parameters of the PI controller of the loop filter are the design parameters of the non-orthogonal phase-locked loop, and the PI parameters need the reasonable design and tuning for ensuring the stability and rapidity of the non-orthogonal phase-locked loop;

step 7: discriminating the polarity of the rotor permanent magnet of the fault-tolerant permanent magnet motor based on the acceleration, resolving the estimated electrical angle $\widehat{\theta_r}$ of the rotor, and performing the fixed compensation for the estimated rotor position;

it is necessary to discriminate the polarity of the rotor permanent magnet for determining $\widehat{\theta_r}$, due to the possible presence of a deviation of 180° between the value acquired by dividing the double estimated electrical angle $2\widehat{\theta_r}$ resolved by the non-orthogonal phase-locked loop by 2 and the actual rotor position; the discrimination of the polarity of the rotor permanent magnet is performed only when the motor is started; the fixed compensation is performed on the estimated rotor inductance acquired from the phase-locked loop for ensuring control accuracy, since the phase of the estimated differential mode inductance signal lags behind the actual value due to the use of the filter.

2. The control method according to claim 1, wherein the fault-tolerant permanent magnet motor system can be operated in the fault mode of an open circuit fault and/or a short circuit fault for a phase winding.

3. The control method according to claim 1, wherein discriminating the polarity of the rotor permanent magnet in step 7 is performed specifically as follows: before the motor is started, causing the motor to operate on a trial basis according to the currently initially rotor position estimated by the non-orthogonal phase-locked loop for a short time, such as milliseconds; discriminating the polarity of the permanent magnet by determining the acceleration direction of the rotor during the short time, then determining that the estimated rotor electrical angle is $2\widehat{\theta_r}/2$ if the acceleration direction coincides with an excitation current, while determining that the estimated rotor electrical angle is $$\frac{2\widehat{\theta_r}}{2} + \pi$$

if the acceleration direction does not coincide with the excitation current.

4. The control method according to claim 1, wherein the isolation drive circuit is composed of a gate isolation drive chip and peripheral circuits of the gate isolation drive chip, which is configured to implement isolation between the strong electrical signal of the power driver and the weak electrical signal of the digital controller for PWM control on the one hand, and to amplify the power of the PWM control signal generated by the FPGA system for driving and controlling the turn-on and turn-off of power MOSFETs on the other hand.

5. The control method according to claim 1, wherein the fault-tolerant power drive circuit is implemented by an H-bridge power drive circuit based on the power MOSFETs, and each phase winding of the fault-tolerant permanent magnet motor is driven and powered by a single H-bridge power drive circuit separately.

6. The control method according to claim 1, wherein the signal detection circuit comprises a current sensor, a signal conditioning circuit and an A/D conversion circuit; the current sensor detects the phase current of each phase winding of the fault-tolerant permanent magnet motor and provides an output in the form of a voltage signal; the signal conditioning circuit performs the low-pass filtering process and the signal level conversion process on the output from the current sensor, and output an analog signal to the A/D conversion circuit; and the A/D conversion circuit converts the analog signal into a digital signal and send the digital signal to the FPGA system; and the differential mode inductance signals of the two non-faulty phase windings are resolved in the DSP system finally by injecting the high-frequency voltage signals in the two non-faulty phase windings and processing the phase current signals of the corresponding windings through the FPGA system and the DSP system, the high precision sensorless resolving for the motor is completed thereby, and the rotor position and speed in the low-speed region of the fault-tolerant permanent magnet motor system in a fault state or in a non-fault state are estimated in real time; the given value of the motor electromagnetic torque instruction is acquired by the DSP system through the calculation of the speed loop controller in the DSP system according to the estimated motor speed and the control instruction signal from the host computer; the given value of the current instruction of the non-faulty phase winding of the motor is calculated by the fault-tolerant controller in the DSP system according to the given value of the motor electromagnetic torque instruction and the current fault state of the motor system, and is sent to the FPGA system; and the FPGA system performs the current loop control and PWM generation.

7. The control method according to claim 1, wherein the DSP system is implemented by a floating-point high-speed DSP with a type number of TMS320F28335, a main frequency of 150 MHz, and a single-precision floating-point processing unit.

8. The control method according to claim 1, wherein the FPGA system is composed of an FPGA chip and its peripheral circuits, and the FPGA chip has a type number of EP2C35F484 with a main frequency of 100 MHz, 33216 logics units, 105 M4K memory blocks, 35 multipliers, and 322 configurable I/O pins;

the functions of the FPGA system include: controlling the current sampling by the A/D sampling control module; performing the fault diagnosis for the fault-tolerant permanent magnet motor system; filtering the sampled current; acquiring the amplitude information of the high-frequency currents by detecting the envelopes of high-frequency response currents; acquiring the given voltage instruction by the calculation of the current loop controller according to the given current instruction input from the DSP and the current feedback value measured by the A/D sampling control module; acquiring the new given voltages of the corresponding phase windings by superimposing the high-frequency voltage signals generated by the high-frequency signal generator onto the given voltages of the corresponding phase windings; and calculating the PWM control signals of the power switch transistors of respective phase windings by the PWM generator module according to the input given voltage signals of respective phases.

9. The control method according to claim 1, wherein the power MOSFET devices in the fault-tolerant power drive circuit have a type number of IXTP90N075T2, which has small conduction loss, small volume and weight, and high power density.

10. The control method according to claim 1, wherein the sensorless control method in low-speed region can be applied for the fault-tolerant permanent magnet motor system of the electric actuators.

11. The control method according to claim 2 wherein discriminating the polarity of the rotor permanent magnet in step 7 is performed specifically as follows: before the motor is started, causing the motor to operate on a trial basis according to the currently initially rotor position estimated by the non-orthogonal phase-locked loop for a short time, such as milliseconds; discriminating the polarity of the permanent magnet by determining the acceleration direction of the rotor during the short time, then determining that the estimated rotor electrical angle is $2\hat{\theta}_r/2$ if the acceleration direction coincides with an excitation current, while determining that the estimated rotor electrical angle is $$\frac{2\hat{\theta}_r}{2}+\pi$$

it the acceleration direction does not coincide with the excitation current.

12. The control method according to claim 2, wherein the isolation drive circuit is composed of a gate isolation drive chip and peripheral circuits of the gate isolation drive chip, which is configured to implement isolation between the strong electrical signal of the power driver and the weak electrical signal of the digital controller for PWM control on the one hand, and to amplify the power of the PWM control signal generated by the FPGA system for driving and controlling the turn-on and turn-off of power MOSFETs on the other hand.

13. The control method according to claim 3, wherein the isolation drive circuit is composed of a gate isolation drive chip and peripheral circuits of the gate isolation drive chip, which is configured to implement isolation between the strong electrical signal of the power driver and the weak electrical signal of the digital controller for PWM control on the one hand, and to amplify the power of the PWM control signal generated by the FPGA system for driving and controlling the turn-on and turn-off of power MOSFETs on the other hand.

14. The control method according to claim 2, wherein the fault-tolerant power drive circuit is implemented by an H-bridge power drive circuit based on the power MOSFETs, and each phase winding of the fault-tolerant permanent magnet motor is driven and powered by a single H-bridge power drive circuit separately.

15. The control method according to claim 3, wherein the fault-tolerant power drive circuit is implemented by an H-bridge power drive circuit based on the power MOSFETs, and each phase winding of the fault-tolerant permanent magnet motor is driven and powered by a single H-bridge power drive circuit separately.

16. The control method according to claim 4, wherein the fault-tolerant power drive circuit is implemented by an H-bridge power drive circuit based on the power MOSFETs, and each phase winding of the fault-tolerant permanent magnet motor is driven and powered by a single H-bridge power drive circuit separately.

17. The control method according to claim 2, wherein the signal detection circuit comprises a current sensor, a signal conditioning circuit and an A/D conversion circuit; the current sensor detects the phase current of each phase winding of the fault-tolerant permanent magnet motor and provides an output in the form of a voltage signal; the signal conditioning circuit performs the low-pass filtering process and the signal level conversion process on the output from the current sensor, and output an analog signal to the A/D conversion circuit; and the A/D conversion circuit converts the analog signal into a digital signal and send the digital signal to the FPGA system; and the differential mode inductance signals of the two non-faulty phase windings are resolved in the DSP system finally by injecting the high-frequency voltage signals in the two non-faulty phase windings and processing the phase current signals of the corresponding windings through the FPGA system and the DSP system, the high precision sensorless resolving for the motor is completed thereby, and the rotor position and speed in the low-speed region of the fault-tolerant permanent magnet motor system in a fault state or in a non-fault state are estimated in real time; the given value of the motor electromagnetic torque instruction is acquired by the DSP system through the calculation of the speed loop controller in the DSP system according to the estimated motor speed and the control instruction signal from the host computer; the given value of the current instruction of the non-faulty phase winding of the motor is calculated by the fault-tolerant controller in the DSP system according to the given value of the motor electromagnetic torque instruction and the current fault state of the motor system, and is sent to the FPGA system; and the FPGA system performs the current loop control and PWM generation.

18. The control method according to claim 3, wherein the signal detection circuit comprises a current sensor, a signal conditioning circuit and an A/D conversion circuit; the current sensor detects the phase current of each phase winding of the fault-tolerant permanent magnet motor and provides an output in the form of a voltage signal; the signal conditioning circuit performs the low-pass filtering process and the signal level conversion process on the output from the current sensor, and output an analog signal to the A/D conversion circuit; and the A/D conversion circuit converts the analog signal into a digital signal and send the digital signal to the FPGA system; and the differential mode inductance signals of the two non-faulty phase windings are resolved in the DSP system finally by injecting the high-frequency voltage signals in the two non-faulty phase windings and processing the phase current signals of the corresponding windings through the FPGA system and the DSP system, the high precision sensorless resolving for the motor is completed thereby, and the rotor position and speed in the low-speed region of the fault-tolerant permanent magnet motor system in a fault state or in a non-fault state are estimated in real time; the given value of the motor electromagnetic torque instruction is acquired by the DSP system through the calculation of the speed loop controller in the DSP system according to the estimated motor speed and the control instruction signal from the host computer; the given value of the current instruction of the non-faulty phase winding of the motor is calculated by the fault-tolerant controller in the DSP system according to the given value of the motor electromagnetic torque instruction and the current fault state of the motor system, and is sent to the FPGA system; and the FPGA system performs the current loop control and PWM generation.

19. The control method according to claim 4, wherein the signal detection circuit comprises a current sensor, a signal conditioning circuit and an A/D conversion circuit; the current sensor detects the phase current of each phase winding of the fault-tolerant permanent magnet motor and provides an output in the form of a voltage signal; the signal conditioning circuit performs the low-pass filtering process and the signal level conversion process on the output from the current sensor, and output an analog signal to the A/D conversion circuit; and the A/D conversion circuit converts the analog signal into a digital signal and send the digital signal to the FPGA system; and the differential mode inductance signals of the two non-faulty phase windings are resolved in the DSP system finally by injecting the high-frequency voltage signals in the two non-faulty phase windings and processing the phase current signals of the corresponding windings through the FPGA system and the DSP system, the high precision sensorless resolving for the motor is completed thereby, and the rotor position and speed in the low-speed region of the fault-tolerant permanent magnet motor system in a fault state or in a non-fault state are estimated in real time; the given value of the motor electromagnetic torque instruction is acquired by the DSP system through the calculation of the speed loop controller in the DSP system according to the estimated motor speed and the control instruction signal from the host computer; the given value of the current instruction of the non-faulty phase winding of the motor is calculated by the fault-tolerant controller in the DSP system according to the given value of the motor electromagnetic torque instruction and the current fault state of the motor system, and is sent to the FPGA system; and the FPGA system performs the current loop control and PWM generation.

20. The control method according to claim 5, wherein the signal detection circuit comprises a current sensor, a signal conditioning circuit and an A/D conversion circuit; the current sensor detects the phase current of each phase winding of the fault-tolerant permanent magnet motor and provides an output in the form of a voltage signal; the signal conditioning circuit performs the low-pass filtering process and the signal level conversion process on the output from the current sensor, and output an analog signal to the A/D conversion circuit; and the A/D conversion circuit converts the analog signal into a digital signal and send the digital signal to the FPGA system; and the differential mode inductance signals of the two non-faulty phase windings are resolved in the DSP system finally by injecting the high-frequency voltage signals in the two non-faulty phase windings and processing the phase current signals of the corresponding windings through the FPGA system and the DSP system, the high precision sensorless resolving for the motor is completed thereby, and the rotor position and speed in the low-speed region of the fault-tolerant permanent magnet motor system in a fault state or in a non-fault state are estimated in real time; the given value of the motor electromagnetic torque instruction is acquired by the DSP system through the calculation of the speed loop controller in the DSP system according to the estimated motor speed and the control instruction signal from the host computer; the given value of the current instruction of the non-faulty phase winding of the motor is calculated by the fault-tolerant controller in the DSP system according to the given value of the motor electromagnetic torque instruction and the current fault state of the motor system, and is sent to the FPGA system; and the FPGA system performs the current loop control and PWM generation.

* * * * *